US008826323B2

United States Patent
Kim

(10) Patent No.: US 8,826,323 B2
(45) Date of Patent: Sep. 2, 2014

(54) METHOD FOR SWITCHING BETWEEN MINOR CHANNELS FOR DIGITAL TELEVISIONS

(75) Inventor: Kwang Seok Kim, Seoul (KR)

(73) Assignee: Maple Vision Technologies Inc., Ottawa ON (CA)

( * ) Notice: Subject to any disclaimer, the term of this patent is extended or adjusted under 35 U.S.C. 154(b) by 919 days.

(21) Appl. No.: 12/189,359

(22) Filed: Aug. 11, 2008

(65) Prior Publication Data

US 2009/0144767 A1    Jun. 4, 2009

(30) Foreign Application Priority Data

Dec. 3, 2007    (KR) .......................... 10-2007-0124287
Dec. 3, 2007    (KR) .......................... 10-2007-0124288

(51) Int. Cl.
*H04N 7/16*    (2011.01)

(52) U.S. Cl.
USPC .................. 725/28; 725/25; 725/26; 725/27; 725/29; 725/31; 348/569

(58) Field of Classification Search
None
See application file for complete search history.

(56) References Cited

U.S. PATENT DOCUMENTS

| 6,817,027 | B1 * | 11/2004 | Curreri ........................... 725/28 |
| 7,154,564 | B2 | 12/2006 | Kim |
| 2001/0052124 | A1 * | 12/2001 | Kim et al. ....................... 725/39 |
| 2003/0233653 | A1 | 12/2003 | Hwang et al. |
| 2008/0136664 | A1 * | 6/2008 | Elsasser et al. .......... 340/825.22 |

FOREIGN PATENT DOCUMENTS

| KR | 20020034246 A | 5/2002 |
| KR | 100774454 B1 | 10/2002 |
| KR | 100451258 B1 | 10/2004 |
| KR | 20060066332 A | 6/2006 |

* cited by examiner

*Primary Examiner* — Joshua Taylor
(74) *Attorney, Agent, or Firm* — Vector IP Law Group; Robert S. Babayi

(57) ABSTRACT

A method for switching between minor channels for digital televisions is disclosed. The method includes determining whether a minor channel is in a non-signal state, analyzing information of a major channel, to which the minor channel in the non-signal state pertains, if the minor channel is in the non-signal state, followed by obtaining information of minor channels pertaining to the major channel, and selecting other minor channels excluding the minor channel in the non-signal state based on an analysis of the information of the minor channels to sequentially determine whether the selected minor channels are in a signal state, followed by switching from the minor channel in the non-signal state to a minor channel in the signal state if a minor channel in the signal state is present.

19 Claims, 7 Drawing Sheets

METHOD FOR SWITCHING BETWEEN MINOR CHANNELS FOR DIGITAL TELEVISIONS

BACKGROUND OF THE INVENTION

1. Field of the Invention

The present invention relates to digital televisions, and more particularly to a method for switching between minor channels for digital televisions which can change a minor channel when the minor channel enters a non-signal state or become a hidden channel.

2. Description of the Related Art

Generally, television broadcasting permits the user to watch a broadcast of a desired channel by determining whether respective broadcast signals, as received through all receivable channels allocated to broadcasting stations, are analog signals or digital signals, followed by selection of an analogue or digital mode based on a determination result in channel navigation.

With an increasing interest in digitalization by the recent development of communication techniques, a digital broadcast service has been provided to select and display a television broadcast or a channel having a digital signal.

In such a digital broadcast service, information as to a channel selected from a previously stored channel map is searched for when the user selects the channel on a remote controller.

Based on the search result, a frequency band of the selected channel is selected and a digital signal carried by the frequency band is then subjected to demodulating, de-multiplexing, and decoding operations to output video and audio.

In such digital broadcasting, a compression method capable of providing high channel efficiency is employed to transmit a number of programs through each channel, wherein a physical channel is referred to as a major channel and a virtual channel for transmitting the respective programs is referred to as a minor channel.

Since allocation of minor channels is determined by broadcasting stations, channel number of the minor channels can be changed, and the minor channels can also be subjected to change from a signal state to a non-signal state.

Further, the minor channels can be provided as a channel for supplying only an audio signal, a channel for supplying only a video signal, or a hidden channel which cannot be watched by the user.

When a certain minor channel enters the non-signal state, a letter conventionally indicates the non-signal state of the minor channel, and in this case, the non-signal state of the minor channel is disadvantageously maintained until the user switches from the minor channel in the non-signal state to another channel.

Further, when a certain minor channel becomes a hidden channel while the user watches this minor channel, the television switches from the minor channel to a major channel and the user cannot watch this minor channel any more, causing an inconvenience of converting again the major channel into the minor channel. Therefore, there is a need for a technique which can overcome such problems of the conventional techniques.

SUMMARY OF THE INVENTION

The present invention is conceived to solve the problems of the conventional techniques as described above, and it is an aspect of the present invention to provide a method for switching between minor channels for digital televisions that can switch from a minor channel, which has entered a non-signal state, to another minor channel, a channel number of which is similar to that of the minor channel in the non-signal state.

It is another aspect of the present invention to provide a method for switching between minor channels for digital televisions that can switch from a minor channel, which has been changed to a hidden channel, to another minor channel, a channel number of which is similar to that of the hidden channel.

In accordance with an aspect of the present invention, a method for switching between minor channels for digital televisions is provided, including: determining whether a minor channel is in a non-signal state; analyzing information of a major channel, to which the minor channel in the non-signal state pertains, if the minor channel is in the non-signal state, followed by obtaining information of minor channels pertaining to the major channel; and selecting other minor channels excluding the minor channel in the non-signal state based on an analysis of the information of the minor channels to sequentially determine whether the selected minor channels are in a signal state, followed by switching from the minor channel in the non-signal state to a minor channel in the signal state if a minor channel in the signal state is present.

The other minor channels pertaining to the major channel may be selected in a different sequence according to a distribution of channel numbers from the minor channel in the non-signal state.

When all of the other minor channels pertaining to the major channel have lower channel numbers than the minor channel in the non-signal state, the other minor channels may be sequentially selected from a minor channel having the highest channel number among the other channels.

When all of the other minor channels pertaining to the major channel have higher channel numbers than the minor channel in the non-signal state, the other minor channels may be sequentially selected from a minor channel having the lowest channel number among the other channels.

When the other minor channels pertaining to the major channel have both higher and lower channel numbers than the minor channel in the non-signal state, minor channels having a higher channel number and a lower channel number may be alternately selected among the other minor channels.

If there is no channel number of the minor channels in analyzing the information of the minor channels, the minor channel in the non-signal state may be changed to the major channel.

The other minor channels excluding the minor channel in the non-signal state may have lower channel numbers than the minor channel in the non-signal state.

The other minor channels excluding the minor channel in the non-signal state may be sequentially selected from a minor channel having the highest channel number among the other minor channels.

The other minor channels excluding the minor channel in the non-signal state may be sequentially selected from a minor channel having the lowest channel number among the other minor channels.

In accordance with another aspect of the present invention, a method for switching between minor channels for digital televisions is provided, including: determining whether a minor channel is a hidden channel; analyzing information of a major channel, to which the hidden channel is pertained, if the minor channel is the hidden channel, followed by obtaining information of minor channels pertaining to the major channel; and selecting other minor channels excluding the hidden channel based on an analysis of the information of the minor channels to sequentially determine whether the selected minor channels are hidden channels and in a signal state, followed by switching from the hidden channel to a minor channel which is not the hidden channel and is in the signal state, if there is the minor channel which is not the hidden channel and is in the signal state.

The other minor channels pertaining to the major channel may be selected in a different sequence according to a distribution of channel numbers from the hidden channel.

When all of the other minor channels pertaining to the major channel have lower channel numbers than the hidden channel, the other minor channels may be sequentially selected from a minor channel having the highest channel number among the other channels.

When all of the other minor channels pertaining to the major channel have higher channel numbers than the hidden channel, the other minor channels may be sequentially selected from a minor channel having the lowest channel number among the other channels.

When the other minor channels pertaining to the major channel have both higher and lower channel numbers than the minor channel in the non-signal state, minor channels having a higher channel number and a lower channel number may be alternately selected as the other minor channels.

If there is no channel number of the minor channels in analyzing the information of the minor channels, the hidden channel may be changed to the major channel.

The other minor channels excluding the hidden channel may have lower channel numbers than the hidden channel.

The other minor channels excluding the hidden channel may be sequentially selected from a minor channel having the highest channel number among the other minor channels.

The other minor channels excluding the hidden channel may be sequentially selected from a minor channel having the lowest channel number among the other minor channels.

BRIEF DESCRIPTION OF THE DRAWINGS

The above and other features and advantages of the present invention will become apparent from the following description of exemplary embodiments given in conjunction with the accompanying drawings, in which.

DETAILED DESCRIPTION OF THE INVENTION

Exemplary embodiments of the present invention will be described in detail with reference to the accompanying drawings hereinafter.

Figure 1:
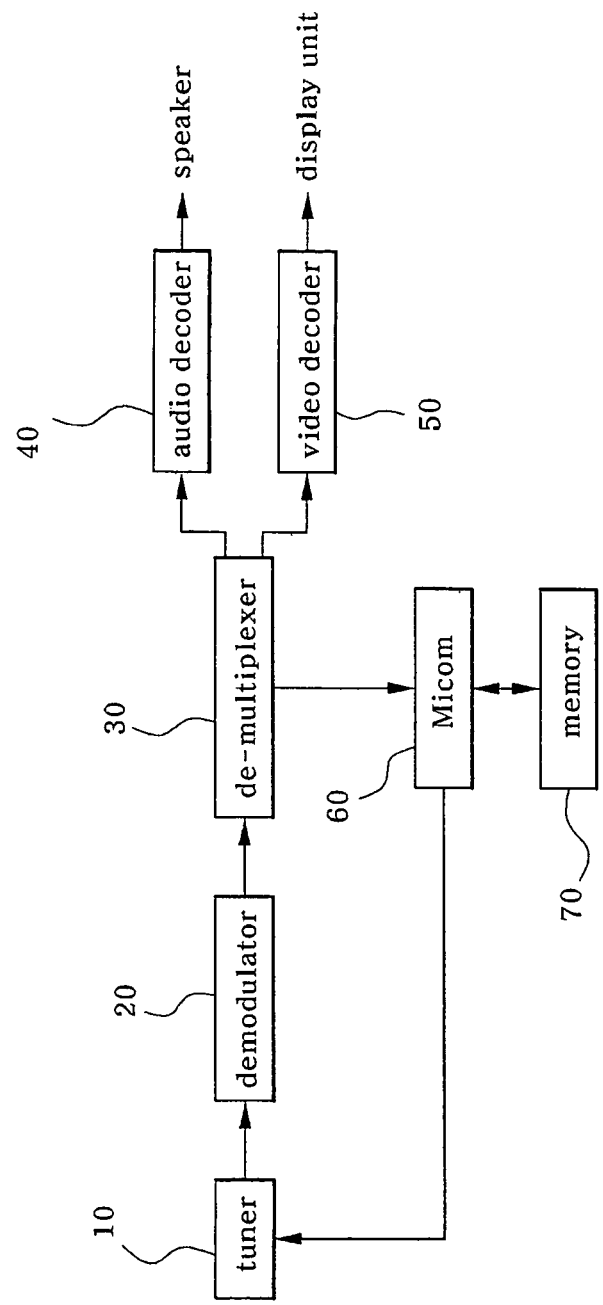
FIG. 1 is a block diagram of a minor channel switching device for digital televisions according to one embodiment of the present invention.

FIG. 1 is a block diagram of a minor channel switching device for digital televisions according to one embodiment of the present invention.

The minor channel switching device according to this embodiment includes a tuner 10, a demodulator 20, a de-multiplexer 30, an audio decoder 40, a video decoder 50, a microprocessor (hereinafter also referred to as "Micom") 60, and a memory 70.

The tuner 10 selects broadcast signals of a minor channel according to a tuning control signal of the Micom 60.

The demodulator 20 receives and demodulates the broadcast signals from the tuner 10 to output the broadcast signals in a transport stream.

The de-multiplexer 30 de-multiplexes the transport stream of the broadcast signals from the demodulator 20 into various kinds of supplemental information including video data, audio data, and channel information to send the video data to the video decoder 50 while sending the audio data to the audio decoder 40.

The video decoder 50 and the audio decoder 40 decode the video data and the audio data sent from the de-multiplexer 30 to output decoded video and audio data through a speaker or a display unit.

The Micom 60 analyzes channel information from the supplemental information, which has been de-multiplexed by the de-multiplexer 30, to obtain information of minor channels as to the number of minor channels and channel numbers thereof, stores the information of the minor channels in a memory 70, and determines based on an analysis of a virtual channel table (VCT) whether a current minor channel watched by the user becomes a hidden channel.

Further, the Micom 60 determines whether a current minor channel selected through the tuner 10 enters a non-signal state or becomes a hidden channel due to a transmission error, a broadcasting station error, or the like, followed by analyzing the information of the minor channels stored in the memory 70 to inspect whether there are other minor channels pertaining to a major channel to which the current minor channel pertains, if it is determined that the current minor channel enters the non-signal state or becomes the hidden channel. Also, the Micom 60 determines whether any of the other minor channels are in a signal state, and controls the digital television to switch from the current minor channel to a minor channel in the signal state.

Figure 2:
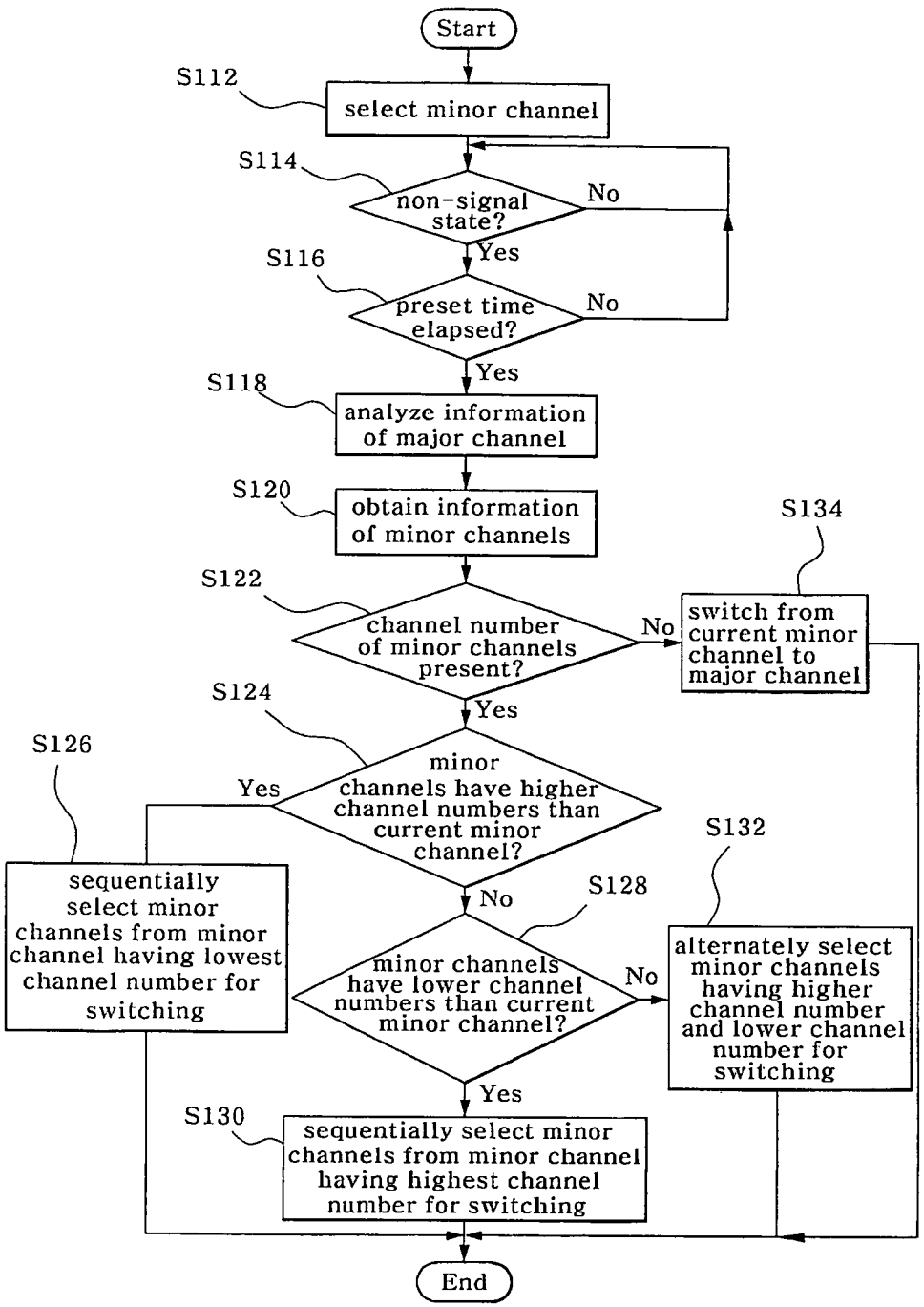
FIG. 2 is a flow chart of a method for switching between minor channels for digital televisions according to a first embodiment of the present invention.

FIG. 2 is a flow chart of a method for switching between minor channels for digital televisions according to a first embodiment of the present invention.

In the method for switching between minor channels according to the first embodiment, after a channel number of a minor channel is directly input by the user using a key input unit (not shown) or the minor channel is selected through channel switching with a channel switching key in S112, it is determined in S114 whether the minor channel enters a non-signal state due to a transmission error, a broadcasting station error, or the like.

If the current minor channel enters the non-signal state, it is determined in S116 whether a preset duration, for example 3~5 seconds, has elapsed in the non-signal state. If it is determined that the preset duration has elapsed, channel information is analyzed based on broadcast signals of a major channel, to which the current minor channel pertains, in S118, and information of minor channels pertaining to the major channel is obtained in S120.

After obtaining the information of the minor channels, the information of the minor channels is analyzed to determine whether there are channel numbers of the minor channels in S122, and, if there is no channel number of the minor channels pertaining to the major channel, the current minor channel is changed to the major channel in S134.

If channel numbers of the minor channels are present, other minor channels pertaining to the same major channel as that of the minor channel in the non-signal state are selected and analyzed in a different sequence according to a distribution of the channel numbers from the minor channel in the non-signal state.

In other words, if the channel numbers of the minor channels are present, it is determined in S124 whether all of the minor channels have higher channel numbers than the minor channel in the non-signal state. If all of the minor channels have the higher channel numbers, the minor channels are sequentially selected from a minor channel having the lowest channel number among them to determine whether the minor channels enters a signal state, and, if a minor channel in the signal state is present, the current channel is changed to this minor channel in S126.

For example, if the channel number of the minor channel in the non-signal state is '6-4' and the channel numbers of the minor channels obtained from the information of the minor channels are '6-5' and '6-6' respectively, the signal states of the minor channels are determined from a minor channel having the lowest channel number among the minor channels, that is, in the sequence of '6-5' and '6-6'.

If the minor channels do not have only higher channel numbers than the minor channel in the non-signal state, it is determined in S128 whether all of the minor channels have lower channel numbers than the minor channel in the non-signal state. Then, if all of the minor channels have the lower channel numbers, the minor channels are sequentially selected from a minor channel having the highest channel number to determine whether the minor channels are in a signal state, and, if a minor channel in the signal state is present, the current channel is changed to this minor channel in S130.

For example, if the channel number of the minor channel in the non-signal state is '6-4' and the channel numbers of the minor channels obtained from the information of the minor channels are '6-2' and '6-3,' the signal states of the minor channels are determined from a minor channel having the highest channel number among the minor channels, that is, in the sequence of '6-3' and '6-2'.

If the minor channels have neither only higher channel numbers nor only lower channel numbers than the minor channel in the non-signal state, it is determined that the minor channels have both higher and lower channel numbers than the minor channel in the non-signal state. Thus, the minor channels of these channel numbers are sequentially selected to determine whether the minor channels are in a signal state, and, if a minor channel in the signal state is present, the current channel is changed to this minor channel in S132.

In other words, the minor channels having higher and lower channel numbers than the minor channel in the non-signal state are alternately selected. In this case, the minor channels having the lower channel numbers than the minor channel in the non-signal state may be preferentially selected, or the minor channels having the higher channel numbers may be preferentially selected according to the same principle.

For example, if the channel number of the minor channel in the non-signal state is '6-4' and the channel numbers of the minor channels obtained from the channel information are '6-2', '6-3', '6-5' and '6-6', the signal states of the minor channels are determined in the sequence of '6-3', '6-5', '6-2' and '6-6' in the case of preferentially selecting the lower channel numbers than the minor channel in the non-signal state, or in the sequence of '6-5', '6-3', '6-6' and '6-2' in the case of preferentially selecting the higher channel numbers.

Figure 3:
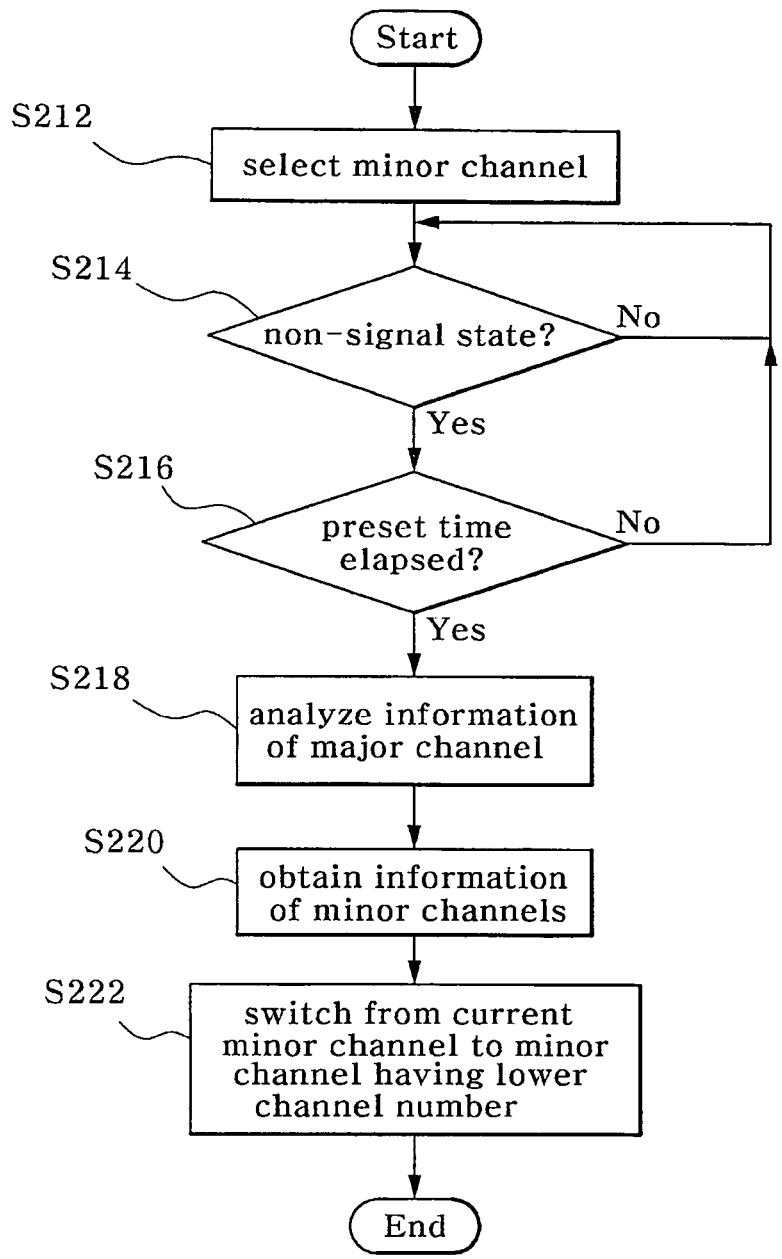
FIG. 3 is a flow chart of a method for switching between minor channels for digital televisions according to a second embodiment of the present invention.

FIG. 3 is a flow chart of a method for switching between minor channels for digital televisions according to a second embodiment of the present invention.

In the method for switching between minor channels according to the second embodiment, after a channel number of a minor channel is directly input by the user on a key input unit (not shown) or the minor channel is selected through channel switching with a channel switching key in S212, it is determined in S214 whether the minor channel enters a non-signal state due to a transmission error, a broadcasting station error, or the like.

If the current minor channel is in the non-signal state, it is determined in S216 whether a preset duration, for example 3~5 seconds, has elapsed in the non-signal state. If it is determined that the preset duration has elapsed, channel information is analyzed based on broadcast signals of a major channel, to which the current minor channel pertains, in S218, and information of minor channels pertaining to the major channel is obtained in S220.

After obtaining the information of the minor channels, the current minor channel is changed to a minor channel having a lower channel number than the minor channel in the non-signal state according to the obtained channel information in S222.

In other words, when the current minor channel enters the non-signal state, other minor channels having lower channel numbers than the current minor channel are sequentially selected from a minor channel having the highest channel number to determine whether the minor channels are in a signal state.

For example, if the channel number of the minor channel in the non-signal state is '6-4', the signal states of the minor channels are repetitiously determined from a minor channel having the highest channel number among the minor channels, that is, in the sequence of '6-3' and '6-2', and if it is determined that a minor channel in the signal state is present, the current minor channel is changed to this minor channel in the signal state.

Then, a broadcast signal of the minor channel in the signal state is demodulated through the demodulator 20, de-multiplexed through the de-multiplexer 30 into video data and audio data, which are respectively decoded by the video decoder 50 and the audio decoder 40 to be output as video and audio.

Figure 4:
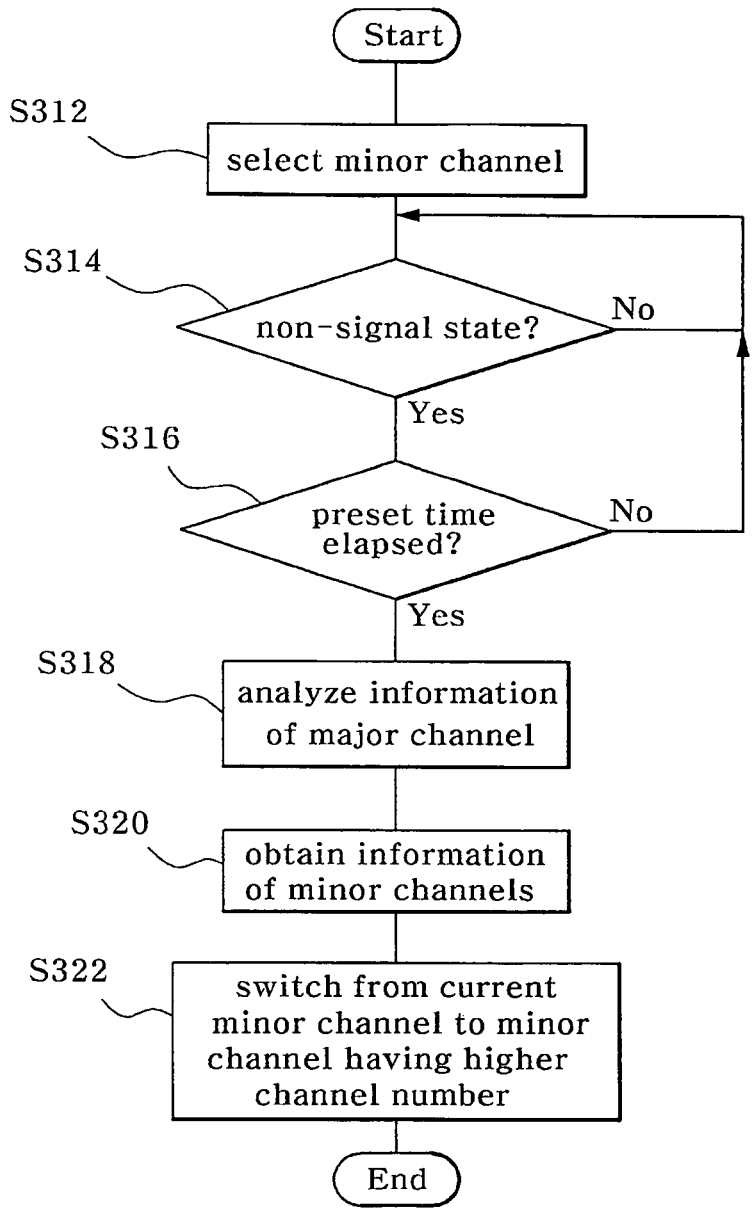
FIG. 4 is a flow chart of a method for switching between minor channels for digital televisions according to a third embodiment of the present invention.

FIG. 4 is a flow chart of a method for switching between minor channels for digital televisions according to a third embodiment of the present invention.

In the method for switching between minor channels according to the third embodiment, after a channel number of a minor channel is directly input by the user on a key input unit (not shown) or the minor channel is selected through channel switching with a channel switching key in S312, it is determined in S314 whether the minor channel enters a non-signal state due to a transmission error, a broadcasting station error, or the like.

If the current minor channel is in the non-signal state, it is determined in S316 whether a preset duration, for example 3~5 seconds, has elapsed in the non-signal state. If it is determined that the preset duration has elapsed, channel information is analyzed based on broadcast signals of a major channel, to which the current minor channel pertains, in S318, and information of minor channels pertaining to the major channel is obtained in S320.

After obtaining the information of the minor channels, the current minor channel is changed to a minor channel having a higher channel number than the minor channel in the non-signal state according to the obtained channel information in S322.

In other words, when the current minor channel enters the non-signal state, other minor channels having higher channel numbers than the current minor channel are sequentially selected from a minor channel having the lowest channel number to determine whether the minor channels are in a signal state.

For example, if the channel number of the minor channel in the non-signal state is '6-4', the signal states of the minor channels are repetitiously determined from a minor channel having the lowest channel number among the minor channels, that is, in the sequence of '6-5' and '6-6', and if it is determined that a minor channel in the signal state is present, the current minor channel is changed to this minor channel in the signal state.

Then, a broadcast signal of the minor channel in the signal state is demodulated through the demodulator 20, de-multiplexed through the de-multiplexer 30 into video data and audio data, which are respectively decoded by the video decoder 50 and the audio decoder 40 to be output as video and audio.

Figure 5:
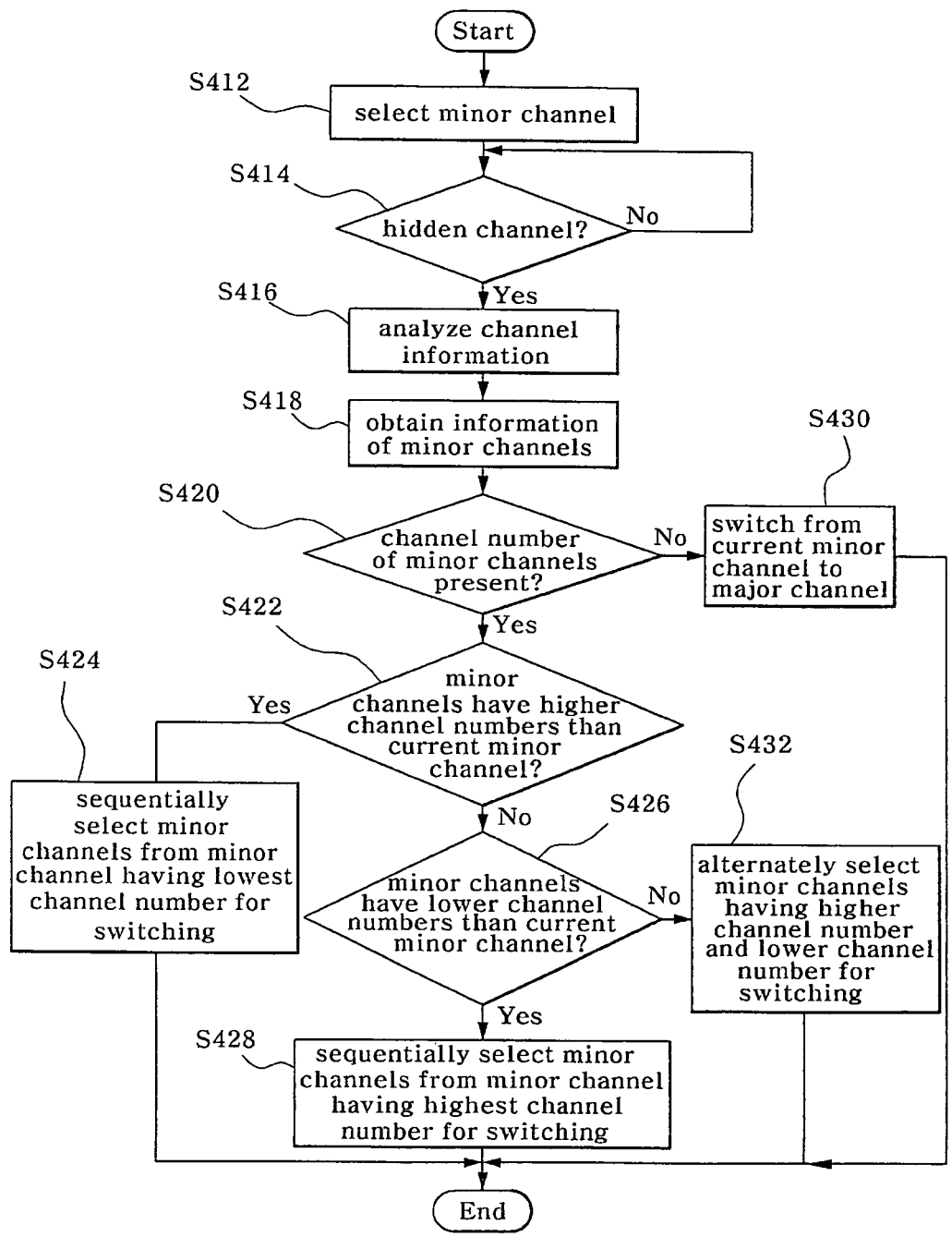
FIG. 5 is a flow chart of a method for switching between minor channels for digital televisions according to a fourth embodiment of the present invention.

FIG. 5 is a flow chart of a method for switching between minor channels for digital televisions according to a fourth embodiment of the present invention.

In the method for switching between minor channels according to the fourth embodiment, particularly, in a hidden channel changing method, after a channel number of a minor channel is directly input by the user on a key input unit (not shown) or the minor channel is selected through channel switching with a channel switching key in S412, it is determined in S414 whether the current minor channel watched by the user becomes a hidden channel.

If the current minor channel becomes the hidden channel, channel information is analyzed based on broadcast signals of a major channel, to which the hidden channel pertains, in S416, and information of minor channels is obtained in S418.

When obtaining the information of the minor channels, the information of the minor channels is analyzed to determine whether there are channel numbers of the minor channels pertaining to the major channel in S420, and, if there is no channel number of the minor channels, the current minor channel, i.e. the hidden channel, is changed to the major channel in S430.

If there are channel numbers of the minor channels, other minor channels excluding the hidden channel are sequentially selected and analyzed to determine whether or not the selected minor channels are hidden channels and in a signal state. If the other minor channels are not the hidden channels and are in the signal state, the other minor channels pertaining to the major channel are analyzed and selected in a different sequence according to a distribution of channel numbers from the hidden channel.

In other words, if the channel numbers of the minor channels are present, it is determined in S422 whether all of the minor channels have higher channel numbers than the hidden channel. If all of the minor channels have the higher channel numbers, the minor channels are sequentially selected from a minor channel having the lowest channel number. Then, it is determined whether the minor channels are hidden channels and in a signal state, and, if a selected minor channel is not the hidden channel and is in the signal state, the current hidden channel is changed to this minor channel in S424.

For example, if the channel number of the hidden channel is '6-4' and the channel numbers obtained from the information of the minor channels are '6-5' and '6-6', the minor channels are selected from a minor channel having the lowest channel number, i.e. in the sequence of '6-5' and '6-6' to determine whether the selected minor channel is the hidden channel and in the signal state, and then, the current hidden channel is changed to the minor channel depending on the determination result.

If there are not only the minor channels having the higher channel numbers, it is determined in S426 whether all of the minor channels have lower channel numbers than the hidden channel. If all of the minor channels have the lower channel numbers, the minor channels are sequentially selected from a minor channel having the highest channel number among them. Then, it is determined whether the minor channels are hidden channels and in a signal state, and, if a selected minor channel is not the hidden channel and is in the signal state, the current hidden channel is changed to this minor channel in S428.

For example, if the channel number of the hidden channel is '6-4' and the channel numbers obtained from the information of the minor channels are '6-2' and '6-3', the minor channels are selected from a minor channel having the highest channel number, i.e. in the sequence of '6-3' and '6-2' to determine whether the selected minor channel is the hidden channel and in the signal state, and then, the current hidden channel is changed to the minor channel depending on the determination result.

On the other hand, if it is determined in S426 that there are not only the minor channels having the lower channel numbers, there are minor channels having both higher and lower channel numbers than the hidden channel. Thus, these minor channels are alternately selected for switching from the hidden channel to another minor channel after determination as to the hidden channel and the signal state in S432.

Namely, the minor channels having the higher and lower channel numbers are sequentially and alternately selected. In this case, the minor channels having the lower channel numbers than the hidden channel may be preferentially selected, or the minor channels having the higher channel numbers may be preferentially selected according to the same principle.

For example, if the channel number of the hidden channel is '6-4' and the channel numbers of the minor channels obtained from the channel information are '6-2', '6-3', '6-5' and '6-6', the minor channels are selected in the sequence of '6-3', '6-5', '6-2' and '6-6' in the case of preferentially selecting the lower channel numbers than that of the hidden channel or in the sequence of '6-5', '6-3', '6-6' and '6-2' in the case of preferentially selecting the higher channel numbers, to determine whether a selected minor channel is a hidden channel and in the signal state.

Therefore, when a certain minor channel becomes a hidden channel, the method according to these embodiments permits automatic selection of other minor channels pertaining to a major channel to which the hidden channel pertains, thereby allowing the user to watch a digital television without an inconvenience of switching from the hidden channel to another minor channel.

Figure 6:
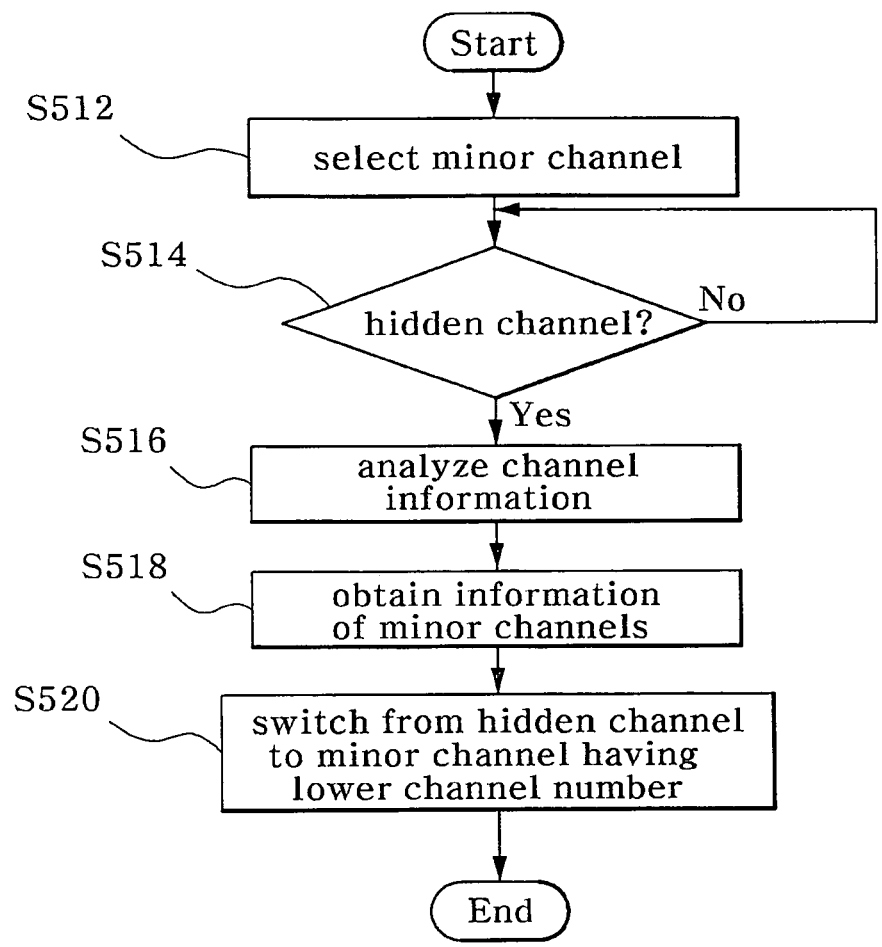
FIG. 6 is a flow chart of a method for switching between minor channels for digital televisions according to a fifth embodiment of the present invention.

FIG. 6 is a flow chart of a method for switching between minor channels for digital televisions according to a fifth embodiment of the present invention.

In the method for switching between minor channels according to the fifth embodiment, particularly, in the hidden channel changing method, after a channel number of a minor channel is directly input by the user on a key input unit (not shown) or the minor channel is selected through channel switching with a channel switching key in S512, channel information is analyzed and it is determined based on an analysis of VCT information in S514 whether the current minor channel watched by the user becomes a hidden channel.

If the current minor channel becomes the hidden channel, a major channel to which the current minor channel pertains is selected to analyze channel information based on broadcast signals of the major channel in S516, and, information of minor channels pertaining to the major channel is obtained in S518.

After obtaining the information of the minor channels, it is repetitiously determined whether selected minor channels are hidden channels and in a signal state to obtain a minor channel, which is not the hidden channel and is in the signal state, followed by switching from the hidden channel to a minor channel having a lower channel number than the hidden channel among the minor channels determined as being not the hidden channels and being in the signal state, in S520.

That is, when the current minor channel become the hidden channel, minor channels having lower channel numbers than the current hidden channel are sequentially selected from a minor channel having the highest channel number among them to determine whether a selected minor channel is a hidden channel and in the signal state.

For example, if the current minor channel changed to the hidden channel has a channel number of '6-4', the minor channels are selected in the sequence of '6-3' and '6-2' to determine whether a selected minor channel is a hidden channel and in the signal state, and the current hidden channel is changed to the selected minor channel depending on the determination result.

Then, a broadcast signal of the selected minor channel, which is not the hidden channel and is in the signal state, is demodulated through the demodulator 20, de-multiplexed through the de-multiplexer 30 into video data and audio data, which are respectively decoded by the video decoder 50 and the audio decoder 40 to be output as video and audio.

Figure 7:
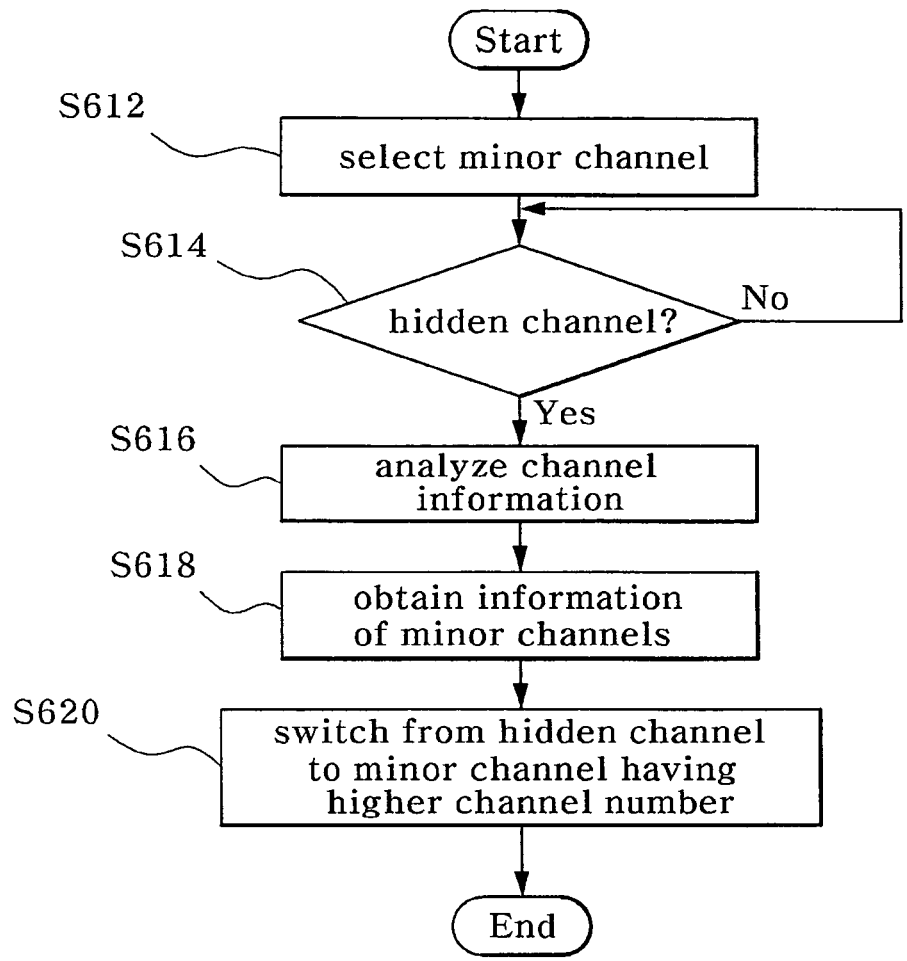
FIG. 7 is a flow chart of a method for switching between minor channels for digital televisions according to a sixth embodiment of the present invention.

FIG. 7 is a flow chart of a method for switching between minor channels for digital televisions according to a sixth embodiment of the present invention.

In the method for switching between minor channels according to the sixth embodiment, particularly, in the hidden channel changing method, after a channel number of a minor channel is directly input by the user on a key input unit (not shown) or the minor channel is selected through channel switching with a channel switching key in S612, channel information is analyzed, and it is determined based on an analysis of VCT information in S614 whether the current minor channel watched by the user becomes a hidden channel.

If the current minor channel becomes the hidden channel, a major channel to which the current minor channel pertains is selected to analyze channel information based on broadcast signals of the major channel in S616, and, information of minor channels pertaining to the major channel is obtained in S618.

After obtaining the information of the minor channels, it is repetitiously determined whether selected minor channels are hidden channels and in a signal state to obtain a minor channel, which is not the hidden channel and is in the signal state, followed by switching from the hidden channel to a minor channel having a higher channel number than the hidden channel among the minor channels determined as being not the hidden channels and being in the signal state, in S620.

In other words, when the current minor channel becomes the hidden channel, minor channels having higher channel numbers than the current hidden channel are sequentially selected from a minor channel having the lowest channel number among them to determine whether a selected minor channel is a hidden channel and in the signal state.

For example, if the current minor channel changed to the hidden channel has a channel number of '6-4', the minor channels are selected in the sequence of '6-5' and '6-6' to determine whether a selected minor channel is a hidden channel and in the signal state, and the current hidden channel is changed to the selected minor channel depending on the determination result.

Then, a broadcast signal of the selected minor channel, which is not the hidden channel and is in the signal state, is demodulate through the demodulator 20, de-multiplexed through the de-multiplexer 30 into video data and audio data, which are respectively decoded by the video decoder 50 and the audio decoder 40 to be output as video and audio.

As apparent from the above description, when a certain minor channel enters a non-signal state, the method according to the present invention permits selection of other minor channels pertaining to a major channel to which the minor channel in the non-signal state pertains, thereby allowing the user to watch a digital television without an inconvenience of switching from the minor channel in the non-signal state to another minor channel which is not in the non-signal state.

Further, when a certain minor channel becomes a hidden channel, the method according to the present invention permits selection of other minor channels pertaining to a major channel to which the hidden channel pertains, thereby allowing the user to watch a digital television without an inconvenience of switching from the hidden channel to another minor channel which is not a hidden channel and is in a signal state.

Although the present invention has been described with reference to the embodiments and the accompanying drawings, it will be apparent to those skilled in the art that the embodiments are given by way of illustration, and that various modifications and equivalent embodiments can be made without departing from the spirit and scope of the present invention. Accordingly, the scope of the present invention should be limited only by the accompanying claims.

What is claimed is:

1. A method for changing one or more minor channels associated with a major channel in a digital television that includes a microprocessor, wherein at any given time, a minor channel is either in a signal state or a non-signal state, wherein a minor channel in a non-signal state is a channel that cannot be watched by a user due to an error, the method comprising:
   determining whether a selected minor channel associated with the major channel enters into the non-signal state from the signal state;
   upon determination of the entry into the non-signal state, analyzing channel information associated with the major channel to determine whether there is another minor channel associated with the major channel that is in the signal state; and
   switching from the selected minor channel that has entered the non-signal state to the major channel upon the determination that there is not another minor channel associated with the major channel that is in the signal state.

2. A method for changing one or more minor channels in accordance with claim 1, wherein when the analyzing channel information determines there is another minor channel associated with the major channel that is in the signal state, the method further comprises switching from the minor channel in the non-signal state to the another minor channel in the signal state.

3. A method for changing one or more minor channels in accordance with claim 1, wherein when the analyzing channel information determines there are two or more additional minor channels associated with the major channel that are in the signal state, the method further comprises switching from the minor channel in the non-signal state to one of the two or more additional minor channels in the signal state, wherein the one of the two or more additional minor channels in the signal state are sequentially selected.

4. A method for changing one or more minor channels in accordance with claim 1, wherein when the analyzing channel information determines there are two or more additional minor channels associated with the major channel that are in the signal state and that all of the two or more additional minor channels in the signal state have lower channel numbers than the minor channel in the non-signal state, the method further comprises switching from the minor channel in the non-signal state to one of the two or more additional minor channels in the signal state having the highest channel number.

5. A method for changing one or more minor channels in accordance with claim 1, wherein when the analyzing channel information determines there are two or more additional minor channels associated with the major channel that are in the signal state and that all of the two or more additional minor channels in the signal state have higher channel numbers than the minor channel in the non-signal state, the method further comprises switching from the minor channel in the non-signal state to one of the two or more additional minor channels in the signal state having the lowest channel number.

6. A method for changing one or more minor channels in accordance with claim 1, wherein when the analyzing channel information determines there are two or more additional minor channels associated with the major channel that are in the signal state and that the two or more additional minor channels in the signal state have both higher and lower channel numbers than the minor channel in the non-signal state, the method further comprises switching from the minor channel in the non-signal state to one of the two or more additional minor channels in the signal state having the lower channel numbers than the minor channel in the non-signal state.

7. A method for changing one or more minor channels in accordance with claim 1, wherein when the analyzing channel information determines there are two or more additional minor channels associated with the major channel that are in the signal state and that the two or more additional minor channels in the signal state have both higher and lower channel numbers than the minor channel in the non-signal state, the method further comprises switching from the minor channel in the non-signal state to one of the two or more additional minor channels in the signal state having the higher channel numbers than the minor channel in the non-signal state.

8. A method for changing one or more minor channels in accordance with claim 1, wherein when the analyzing channel information determines there are two or more additional minor channels associated with the major channel that are in the signal state and that the two or more additional minor channels in the signal state have both higher and lower channel numbers than the minor channel in the non-signal state, the method further comprises switching from the minor channel in the non-signal state to one of the two or more additional minor channels in the signal state, wherein the one of the two or more additional minor channels in the signal state is alternately selected from between the two or more additional minor channels in the signal state having the lower channel numbers and higher channel numbers.

9. A method for changing one or more minor channels in accordance with claim 1, further comprising determining whether a preset duration of time has elapsed after the minor channel has entered into the non-signal state and before the analyzing of the channel information of the major channel.

10. A method for changing one or more minor channels associated with a major channel in a digital television that includes a microprocessor, wherein at any given time, a that cannot be watched by a user due to an error minor channel is either a hidden channel or not a hidden channel that can be watched by user, the method comprising:
determining whether a selected minor channel associated with the major channel that is not a hidden channel becomes a hidden channel;
upon determination of the selected minor channel becoming a hidden channel, analyzing channel information associated with the major channel to determine whether there is another minor channel associated with the major channel that is in a signal state and not a hidden channel; and
switching from the selected minor channel that has become a hidden channel to the major channel upon the determination that there is not another minor channel associated with the major channel that is in the signal state and not a hidden channel.

11. A method for changing one or more minor channels in accordance with claim 10, wherein when the analyzing channel information determines there is another minor channel associated with the major channel that is in the signal state and not a hidden channel, the method further comprises switching from the minor channel that has become a hidden channel to the one another minor channel in the signal state and not a hidden channel.

12. A method for changing one or more minor channels in accordance with claim 10, wherein when the analyzing channel information determines there are two or more additional minor channels associated with the major channel that are in the signal state and not hidden channels, the method further comprises switching from the minor channel that has become a hidden channel to one of the two or more additional minor channels in the signal state and not hidden channels, wherein the one of the two or more additional minor channels in the signal state and not hidden channels are sequentially selected.

13. A method for changing one or more minor channels in accordance with claim 10, wherein when the analyzing channel information determines there are two or more additional minor channels associated with the major channel that are in the signal state and not hidden channels and that all of the two or more additional minor channels in the signal state and not hidden channels have lower channel numbers than the minor channel in the non-signal state, the method further comprises switching from the minor channel that has become a hidden channel to one of the two or more additional minor channels in the signal state and not hidden channels having the highest channel number.

14. A method for changing one or more minor channels in accordance with claim 10, wherein when the analyzing channel information determines there are two or more additional minor channels associated with the major channel that are in the signal state and not hidden channels, and that all of the two or more additional minor channels in the signal state and not hidden channels have higher channel numbers than the minor channel in the non-signal state, the method further comprises switching from the minor channel that has become a hidden channel to one of the two or more additional minor channels in the signal state and not hidden channels having the lowest channel number.

15. A method for changing one or more minor channels in accordance with claim 10, wherein when the analyzing channel information determines there are two or more additional minor channels associated with the major channel that are in the signal state and not hidden channels, and that the two or more additional minor channels in the signal state and not hidden channels have both higher and lower channel numbers than the minor channel in the non-signal state, the method further comprises switching from the minor channel that has become a hidden channel to one of the two or more additional minor channels in the signal state and not hidden channels having the lower channel numbers than the minor channel in the non-signal state.

16. A method for changing one or more minor channels in accordance with claim 10, wherein when the analyzing channel information determines there are two or more additional minor channels associated with the major channel that are in the signal state and not hidden channels, and that the two or more additional minor channels in the signal state and not hidden channels have both higher and lower channel numbers than the minor channel in the non-signal state, the method further comprises switching from the minor channel that has become a hidden channel to one of the two or more additional minor channels in the signal state and not hidden channels having the higher channel numbers than the minor channel in the non-signal state.

17. A method for changing one or more minor channels in accordance with claim 10, wherein when the analyzing channel information determines there are two or more additional minor channels associated with the major channel that are in the signal state and not hidden channels, and that the two or more additional minor channels in the signal state and not hidden channels have both higher and lower channel numbers than the minor channel in the non-signal state, the method further comprises switching from the minor channel that has become a hidden channel to one of the two or more additional minor channels in the signal state and not hidden channels, wherein the one of the two or more additional minor channels in the signal state and not hidden channels is alternately selected from between the two or more additional minor channels in the signal state and not hidden channels having the lower channel numbers and higher channel numbers.

18. A method for changing one or more minor channels associated with a major channel in a digital television that includes a microprocessor, wherein at any given time, a minor channel is either in a signal state or a non-signal state, wherein a minor channel in a non-signal state is a channel that to cannot be watched by a user due to an error the method comprising:
   determining whether a selected minor channel associated with the major channel enters into the non-signal state from the signal state;
   upon determination of the entry into the non-signal state, analyzing channel information associated with the major channel to determine whether there is another minor channel associated with the major channel that is in the signal state; and
   switching from the selected minor channel that has entered the non-signal state to another minor channel associated with the major channel that is in the signal state upon the determination that there is another minor channel associated with the major channel that is in the signal state.

19. A method for changing one or more minor channels associated with a major channel in a digital television that includes a microprocessor, wherein at any given time, a minor channel is either a hidden channel that cannot be watched by a user due to an error or not a hidden channel that can be watched by the user, the method comprising:
   determining whether a selected minor channel associated with the major channel that is not a hidden channel becomes a hidden channel;
   upon determination of becoming a hidden channel, analyzing channel information associated with the major channel to determine whether there is another minor channel associated with the major channel that is in a signal state and not a hidden channel; and
   switching from the selected minor channel that has become a hidden channel to another minor channel associated with the major channel that is in a signal state and not a hidden channel upon the determination that there is another minor channel associated with the major channel that is in the signal state and not a hidden channel.

* * * * *